United States Patent [19]

Massé et al.

[11] Patent Number: 4,524,904
[45] Date of Patent: Jun. 25, 1985

[54] VAULT

[76] Inventors: Lionel Massé, 578 Notre Dames St., Embrum, Ontario K0A 1W0; Richard L. Boisvert, 4 Place Radisson, Apt. 103, Hull, P.Q., both of Canada

[21] Appl. No.: 385,882

[22] Filed: Jun. 7, 1982

[51] Int. Cl.³ .............................................. E05G 1/00
[52] U.S. Cl. ........................................ 232/7; 232/15; 232/4 R; 109/45; 109/50
[58] Field of Search .............. 232/1 R, 1 D, 1 E, 4 R, 232/4 D, 7, 14, 15, 11, 12, 43.2, 43.5; 109/50, 52, 73, 45; 70/85-88, 258; 220/210, 345

[56] References Cited

U.S. PATENT DOCUMENTS

| 636,947 | 11/1899 | Bishop | 232/7 |
|---|---|---|---|
| 1,032,876 | 7/1912 | Bucknam | 232/12 |
| 1,713,890 | 5/1929 | Clark | 232/43.2 |
| 1,950,974 | 3/1934 | Dana | 232/7 |
| 2,010,877 | 8/1935 | Morell | 232/1 D |
| 2,404,043 | 7/1946 | Dilley | 232/1 |
| 2,798,445 | 7/1957 | Gehman | 109/50 |
| 3,083,896 | 4/1963 | Cairelli et al. | 109/52 |
| 3,433,185 | 3/1969 | Roberts | 232/15 |
| 3,527,176 | 9/1970 | Losapio | 232/15 |
| 3,610,177 | 10/1971 | Shapiro | 232/4 R |
| 4,126,267 | 11/1978 | Emmie | 232/4 |
| 4,262,957 | 4/1981 | Wise et al. | 232/15 |

FOREIGN PATENT DOCUMENTS 667501 7/1963 Canada .................................. 109/1

Primary Examiner—Robert P. Swiatek
Assistant Examiner—Kris R. Schulze

[57] ABSTRACT

The specification describes a paper-currency vault for use in a vehicle such as a taxi cab for storing paper-currency in excess of a predetermined amount during the normal shift of the taxi cab driver so as to discourage robbery attempts on taxi cab drivers, the vault being formed with a housing adapted to be rigidly secured to a support surface in the vehicle, the housing having a chamber adapted to slidably receive a paper-currency receptacle and a slot opening into the chamber and the receptacle when the receptacle is in a closed position, and a key operated lock for selectively locking the receptacle in its closed position.

2 Claims, 5 Drawing Figures

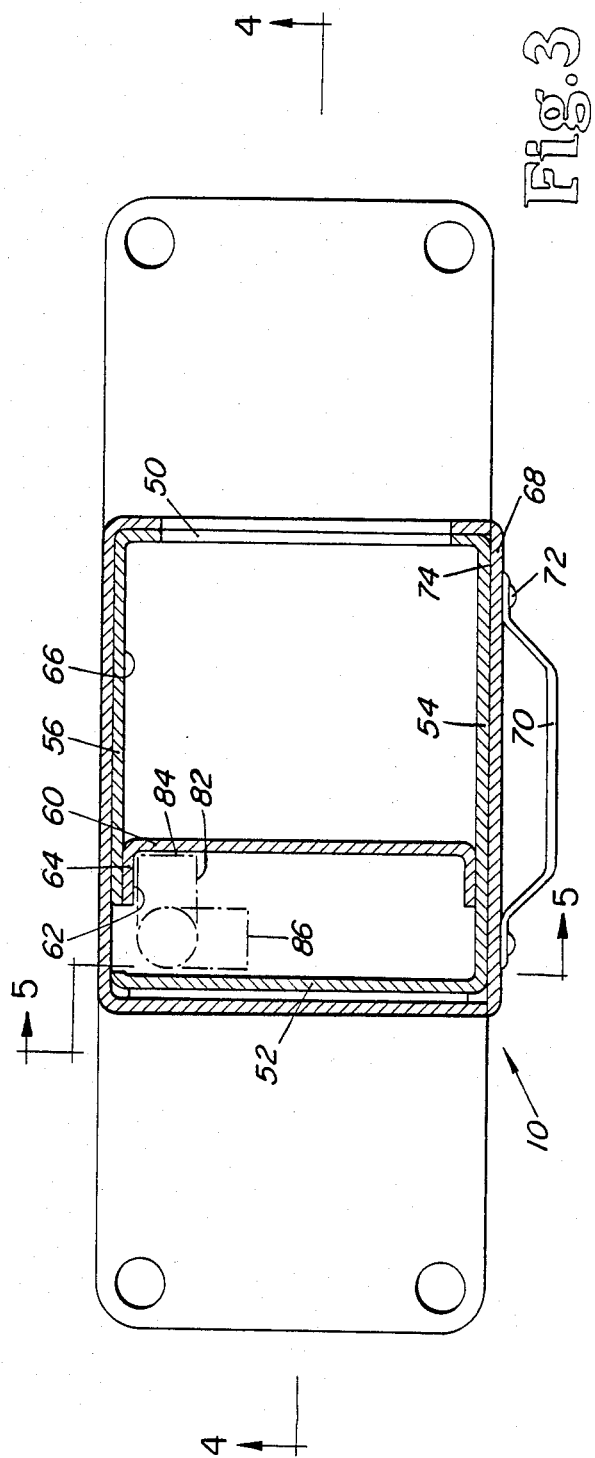
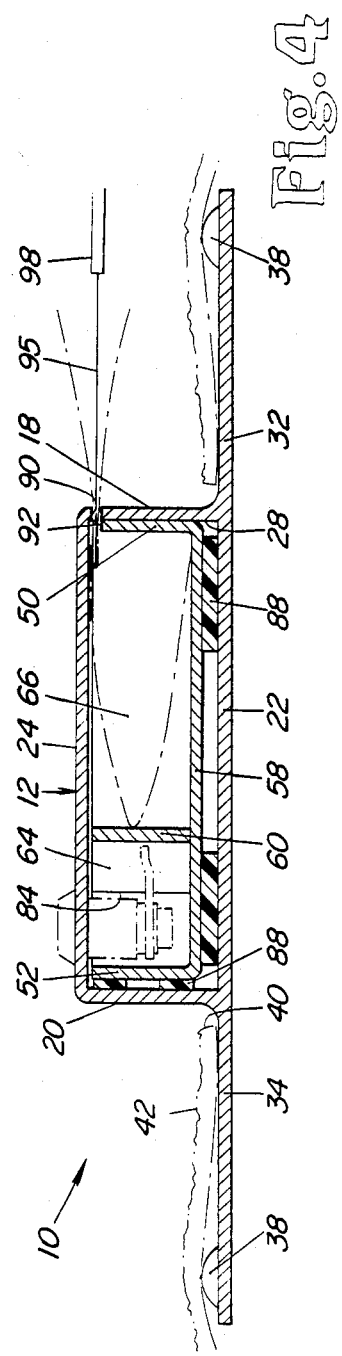

VAULT

The present invention generally relates to money vaults and particularly to vehicle mounted paper money vaults.

The incidence of robberies or attempted robberies of taxi cab drivers has increased markedly in recent years. Taxi cab drivers are particularly good targets for robbers because drivers work alone in evening and night shifts and it is the nature of their work to travel to secluded areas. Further, at the end of a long shift, taxi cab drivers may have accumulated up to several hundred dollars in fares. Heretofore, collected fares have been carried on the person of the taxi cab driver and thus it is relatively easy for a robber to relieve the taxi cab driver of his collected fares.

The present invention seeks to provide a compact money vault or safe which is rigidly and relatively permanently secured to the interior of a vehicle adjacent the driver's seat and constructed such that paper money can readily and conveniently be fed into the vault. During the course of his duties, the taxi driver has no access to the interior of the vault. When it becomes relatively widely known that taxi cabs are provided with relatively non-removable and non-destructive vaults and that drivers do not have access to them, it is believed that the incidence of robbery attempts on taxi cab drivers will considerably diminish.

Thus, the present invention provides, in general, a vault comprising a housing adapted to be rigidly secured to a support surface, a receptacle slidably mounted in the housing between a closed position and an opened position, lock means for retaining the drawer in its closed position and a slot in the housing opening into the interior of the drawer when the drawer is in its closed position whereby money can be inserted into the housing without opening the drawer.

These and other features of the invention will become apparent from the following description in which reference is made to the appended drawings wherein:

FIG. 3 is a plan view, partially in section, of the vault;

FIG. 4 is a longitudinal cross-sectional view taken along line 4—4 of FIG. 3.

Figure 2:
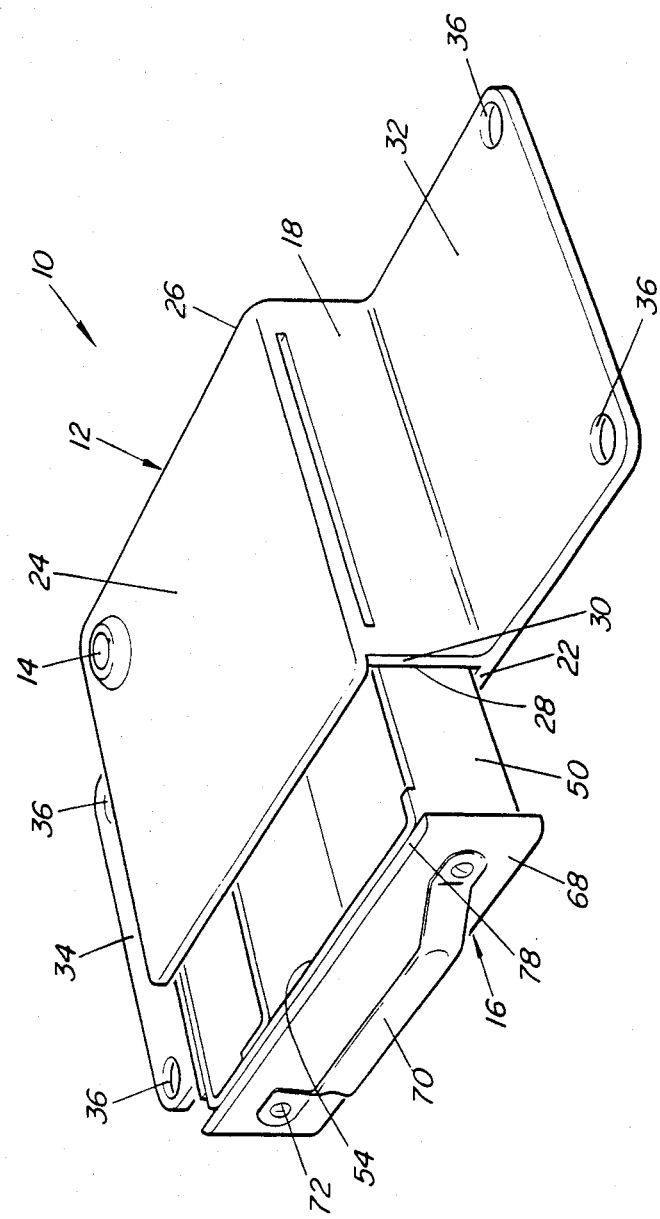
FIG. 2 is a perspective view of the vault illustrating the receptacle in a partially open position.

With reference to FIG. 2 of the drawings, the vault, generally designated by reference numeral 10 is comprised of a generally rectangular housing or casing 12, a lock means 14 secured to the housing and a currency receptacle 16 slidably mounted in the housing in a manner to be described more fully hereinbelow.

Figure 5:
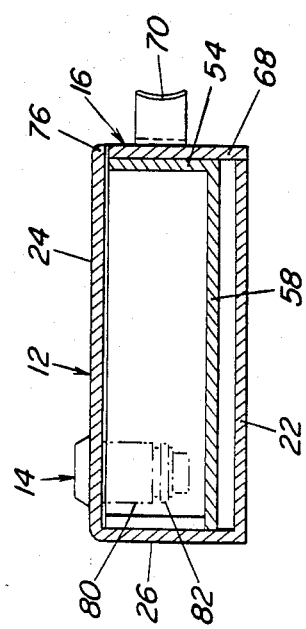
FIG. 5 is a transverse cross-sectional view taken along line 5—5 of FIG. 3.
Figure 1:
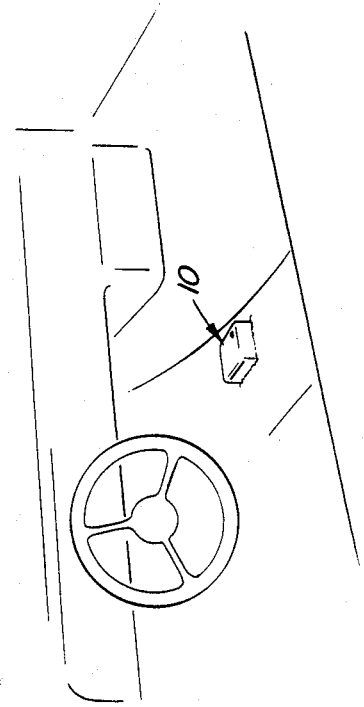
FIG. 1 is a diagrammatic perspective view of the interior of a vehicle illustrating the vault of the present invention secured to the vehicle floor.

The housing 12 is of rectangular box shape having relatively thick walls of sheet steel or the like, such as $\frac{1}{8}$ inch or greater, including opposed end walls 18 and 20, bottom and top walls 22 and 24, a side wall 26 so as to define an interior chamber 28 having an opening 30 on the side remote from side 26. Extending longitudinally of bottom wall 22 are flanges 32 and 34 having apertures 36 for receiving the shank of a round headed bolt 38, such as a carriage bolt, for securing the housing to the floor of a vehicle adjacent the driver's seat as diagrammatically illustrated in FIG. 1 of the drawings. The shank of the bolts extend through the floor of the vehicle and receive appropriate nuts and washers (not shown) from the underside of the vehicle. Thus, it will be seen that it would be relatively difficult to remove the vault from the vehicle in the period of time within which a robber would expect to carry out his deed.

The housing 12 extends through a generally rectangular aperture 40 cut into the rug, which are now generally conventional, of the vehicle, and the flanges 32 and 34 and carriage bolts 38 underlie the rug as best shown in FIG. 4. This arrangement not only enhances the appearance of the vault in a vehicle but also restricts quick access to the carriage bolts and thereby increases the difficulty of removing the vault from the vehicle.

As also shown, the exposed corners of the housing are rounded so as to enhance the appearance of the vault and make it difficult to grasp the vault or apply any prying force to it.

The currency-receptacle or drawer 16 is generally of rectangular box shape formed of relatively thick sheet metal, such as $\frac{1}{8}$ inch or greater steel, having opposed end walls 50 and 52, opposed side walls 54 and 56 and a floor 58. A channel member 60 extends between and is secured to the opposed side walls 54 and 56 as best shown in FIG. 3 of the drawings. The open side of channel member 60 faces end wall 52 and the inside surface 62 of the arm 64 of member 60 defines a shoulder for abutting, latching engagement with the latch member of a lock as will be explained later. Channel 60 serves to reinforce the drawer and housing against vertically applied impact forces and define a currency chamber 66.

An end plate 68 having a handle 70 is secured to side wall 54 of the drawer by rivets 72 or the like. While plate 68 could be formed integrally with the drawer or relatively permanently secured thereto as by welding, it is preferred to use a fastening means such as rivets in order to encourage any would-be robbers, who attempt to gain access to the vault, to carry out an unproductive, time consuming task. It will be seen that if the would-be robber succeeds in removing plate 68, he will still not have access to the interior of the drawer by virtue of the existence of side wall 54 thereof.

Face plate 68 also serves to locate the drawer 16 in its closed position, as illustrated in FIG. 3. It will be noted that the marginal areas of the ends and bottom of rear surface 74 of face plate 68 abuttingly engage the side and bottom edges of opening 30 of housing 12. A rounded lip 76 extends laterally outwardly of top wall 24 of housing 12 so as to overlie the upper edge 78 of the plate 68. Lip 76 serves to make it difficult to insert a prying instrument between face plate 68 or wall 54 of the drawer and the top wall 24 of the housing.

Lock 14 is mounted in top wall 24 of housing 12 adjacent side wall 26. The lock is preferably a key operated type having a body portion 80 and a rotatable latch member 82 and wherein the key can be removed from the lock only when the latter is in its latched position.

Drawer 16 is formed with an opening 84 in side wall 56 so as to receive the body portion 80 of lock 14. The latch member 82 is movable from the latched position 84 (FIG. 3) to unlatched position 86 by manipulating a removable key (not shown).

Strips of vibration dampening material 88, such as Teflon (trade mark), may be secured to either the interior surfaces of end walls 18 and 20 and bottom wall 22 or the exterior surfaces of adjacent end walls 50 and 52 and bottom wall 58 of the drawer. In the illustrated embodiment, the vibration dampening strips 88 are applied only to the exterior surface of end wall 52 and bottom wall 58 of the drawer.

An elongated slot 90 is formed in end wall 18 of the housing 12 and extends into chamber 28 of the housing. A notch 92, if necessary, is formed in the upper edge of end wall 50 of the drawer 16, which notch is in registry with slot 90 of the housing when the drawer is in its closed position. The length of the slot is only slightly greater than the width of the currency with which the vault is most likely to be used while the width of the slot is only slightly thicker than twice the thickness of the currency plus the thickness of a relatively thin blade 95 of a currency inserting tool 98.

In use, the vault 10 is mounted in an appropriate location in the vehicle adjacent the driver's seat. Preferably, the vault is secured to the floor using carriage bolts 38 with the heads of the carriage bolt and the flanges 32 and 34 inserted beneath a rug 42. Further, slot 90 is adjacent the driver's seat so as to facilitate insertion of paper money into the vault by the driver and the plate 68 faces forwardly of the vehicle so that the drawer cannot be seen from the rear seat of the vehicle.

The key for the vault is left at some location other than in the vehicle or the possession of the cab driver. Preferably, the key would be left with the cab company dispatcher. The driver would routinely insert during his shift any paper money in excess of a predetermined amount, such as, for example, twenty dollars into the vault. In order to insert paper money into the vault, the bill is transversely folded over the end blade 95 of tool 98 and inserted into slot 90 of housing 12 until such time as the free ends of the bill spring apart inside the drawer. The tool is then retracted, the edges of the bill bearing against inner surfaces of the drawer or housing and thereby being retained in the vault. When the driver returns to the dispatch location, he retrieves the key from the dispatcher, unlatches and withdraws the drawer from the housing. Once he has removed the currency from the drawer, the drawer is reinserted into the housing, the lock is re-latched and the key is returned to the dispatcher.

In the event of a robbery attempt, the driver simply indicates that collected fares have been placed in the vault and that the key has been left with the dispatcher. In many cases, that should be sufficient to discourage the robber. In the event that it does not, it will be seen that the robber will meet with considerable difficulty in opening the vault or removing it from the vehicle. Without appropriate tools, it is highly unlikely that the robber could successfully extract the drawer from the housing within the obvious time constraints.

It will be understood that the above described vault may have applications in areas other than vehicles. It will also be understood that various modifications and alterations may be made to the vault without departing from the spirit of the appended claims.

The embodiments of the invention in which an exclusive property or privilege is claimed are defined as follows:

1. A paper currency vault for use in a vehicle, comprising, a housing having a pair of opposed, generally rectangularly shaped, substantially parallel end walls, a pair of relatively closely spaced, substantially parallel top and bottom walls which extend between said end walls in substantially perpendicular relation to said end walls, a side wall which extends between said top and bottom walls and said end walls, said top and bottom walls, said end walls and said side wall cooperating to define a generally rectangular chamber having an opening along one side thereof, and an elongated, narrow slot in one of said end walls opening into said chamber, said slot being substantially parallel to said top and bottom walls and exceeding the width of said paper currency;

a box shaped paper currency receptacle having a rectangular bottom wall and two pairs of opposed side walls extending substantially perpendicularly from the marginal edges of said receptacle bottom wall, an open upper end and an interior partition extending between a pair of said receptacle side walls, said partition, said pair of side walls between which said partition extends, and another of said receptacle side walls defining a second, rectangular chamber for receiving and storing paper currency therein in a folded condition wherein said currency is folded about a transverse fold line, said receptacle being disposed in said chamber of said housing and being slidable therein between a closed position whereat one of said side walls of said receptacle closes said opening of said housing chamber and the interior of said receptacle is inaccessible from the exterior of said slot and an opened position whereat the interior of said receptacle is accessible for removal of paper currency therefrom, said receptacle having a width parallelling said slot and exceeding the width of said paper currency and a length exceeding one half the length of said paper currency, an aperture in one of said receptacle side walls alignable with said slot in said closed position of said receptacle for communicating to said chamber paper currency fed through said slot, and a separable end plate secured to said one receptacle side wall closing said opening; and a key operated lock secured to the top wall of said housing and extending into said chamber, said lock having a latch member movable between a latching position and non-latching position and said receptacle having a latch surface engageable with said latch member in said latched position of said latch member and said closed position of said receptacle.

2. A vault as defined in claim 1, in combination with a tool for inserting paper currency into said storage chamber via said slot, said tool having a bladed portion over which said paper currency is folded about said fold line.

* * * * *